(12) United States Patent
Bryant

(10) Patent No.: US 6,491,779 B1
(45) Date of Patent: Dec. 10, 2002

(54) METHOD OF FORMING A COMPOSITE TUBULAR ASSEMBLY

(75) Inventor: Michael J. Bryant, Houston, TX (US)

(73) Assignee: Deepsea Flexibles, Inc., Houston, TX (US)

( * ) Notice: Subject to any disclaimer, the term of this patent is extended or adjusted under 35 U.S.C. 154(b) by 0 days.

(21) Appl. No.: 09/557,271

(22) Filed: Apr. 24, 2000

Related U.S. Application Data

(60) Provisional application No. 60/132,207, filed on May 3, 1999.

(51) Int. Cl.$^7$ ................................................ B65H 81/00
(52) U.S. Cl. .................... 156/192; 156/169; 156/171; 156/191
(58) Field of Search ................... 156/171, 175, 156/173, 169, 192, 187, 188, 191

(56) References Cited

U.S. PATENT DOCUMENTS

| | | | |
|---|---|---|---|
| 3,112,234 A | * 11/1963 | Krupp | ........................ 156/173 |
| 3,189,510 A | * 6/1965 | Eldred | ........................ 156/189 |
| 3,357,456 A | 12/1967 | Grawey et al. | |
| 3,616,123 A | 10/1971 | Reynolds et al. | |
| 3,770,541 A | * 11/1973 | Gilbu | ........................ 156/171 |
| 3,790,438 A | 2/1974 | Lewis et al. | |
| 3,921,674 A | 11/1975 | Logan et al. | |
| 3,982,982 A | 9/1976 | Chudgar | |
| 4,013,102 A | 3/1977 | DeLorean et al. | |
| 4,136,715 A | 1/1979 | McCormack et al. | |
| 4,175,992 A | 11/1979 | Grawey | |
| 4,258,756 A | 3/1981 | Gilman et al. | |
| 4,262,704 A | 4/1981 | Grawey | |
| 4,457,068 A | 7/1984 | Maier, Jr. | |
| 4,822,444 A | * 4/1989 | Weingart et al. | ............ 156/175 |
| 4,830,694 A | 5/1989 | Kanao | |
| 5,261,462 A | 11/1993 | Wolfe et al. | |
| 5,435,867 A | * 7/1995 | Wolfe et al. | ................. 156/171 |

* cited by examiner

*Primary Examiner*—Jeff H. Aftergut
(74) *Attorney, Agent, or Firm*—Akin Gump Strauss Hauer & Feld LLP

(57) ABSTRACT

A composite tubular assembly formed by a core or tube which is reinforced by a multitape product which is wrapped in alternate non-bonded helical wraps on the core or tube. Each tape is first formed by impregnating a fibrous strip with a resin and then such tapes are fed from spools to the core of the tube.

12 Claims, 2 Drawing Sheets

METHOD OF FORMING A COMPOSITE TUBULAR ASSEMBLY

CROSS-REFERENCE TO RELATED APPLICATIONS

This application claims the benefit of U.S. provisional application Serial No. 60,132,207 filed May 3, 1999.

STATEMENT REGARDING FEDERALLY SPONSORED RESEARCH

Not applicable.

BACKGROUND OF THE INVENTION

1. Field of the Invention

The field of the invention is flexible pipe for conducting petroleum or other fluids subsea or on land and the method of forming same.

2. Description of the Related Art

Conventional bonded flexible pipe is described in American Petroleum Institute document API Specification 17J. These types of pipe are typically used for both "sweet" and "sour" service production, including export and injection services. Fluids transported include oil, gas, water and injection chemicals and gas. A typical construction is made up of a plurality of tubular layers, starting with an interlocking metal carcass and followed by a liner tube of plastic to retain the fluid within the pipe. Hoop strength armor reinforcement in the hoop direction is provided by helical metal wires which may be in several layers and wound in opposite helical directions. Additional layers may also be used, with a final jacket extrusion to complete the assembly, with a tough wear resistant material.

U.S. Pat. Nos. 5,261,462 and 5,435,867, both issued to Donald H. Wolfe, et al., are examples of tubular composite pipe in the prior art. Those patents relate to tubular structures having a plastic tube for the fluid conductor, which has an outer layer formed form alternating spirally wound strips of composite and elastomer. It is believed that the prior art composite pipes, such as disclosed in the above patents, have been limited to relatively short commercial lengths, by reason of the method by which such tubular structures have been made.

Typically, composite flexible pipes are made by filament winding, which involves turning the pipe while feeding and moving resin impregnated fibers from bobbins back and forth along the length of the pipe. Such technique limits the length of the reinforced flexible pipe which can be manufactured because of the number of bobbins required for the large number of fibers that are used in each pass. As a practical matter, it was not known how to make relatively long lengths of composite pipe sufficient for subsea use because of such problem.

In single bobbin machines, unloading and reloading time is a function of the time taken to thread each end of the fibers, the number of bobbins, and the time required to replace each bobbin. Also, due to the material payload requirements, a single bobbin-type machine will require each end to travel some distance from its bobbin over rollers, sheaves, eyelets, etc., through the machine to the closing point on the pipe, thus creating a time-consuming task. Because of the hundreds, and even thousands of bobbins, extremely large machines would be required to make a composite reinforced pipe in long lengths by such prior art techniques, consequently, the industry has not had available composite flexible pipes in long lengths suitable for subsea production and well operations. Multiple fiber tows are also not practical for long pipe lengths because of the fiber loading times required.

SUMMARY OF THE INVENTION

With the present invention, discrete tapes are first formed from the fibers and resin or the like, so that the tapes are wound on spools which reduces the number of bobbins required as compared to the number of bobbins required for single fiber filaments, whereby it is possible to manufacture long lengths of composite flexible pipe. The tapes are initially formed and then are fed from tape spools rather than the fiber bobbins in the prior art. Also, each tape is composed of a plurality of superimposed thin tape strips formed of predominantly, unidirectional fibers, which are impregnated with an epoxy or other suitable bonding resin which cures with heat, cold, ultraviolet (UV) or other curing methods. The multi-layer tapes are wrapped with a polyethylene or similar plastic or thin metallic strip or covered by thermoplastic extrusion to confine them as a unit together, with bonding adhesive between the tape strips being prevented from escaping from the wrap. Each tape thus made is fed from a tape spool to the tubular core as the tubular core is rotated, or as the spools are rotated relative to the core, which produces helical wraps of each of the tapes on the tubular core in the same or opposite helical directions for reinforcement of the core.

DETAILED DESCRIPTION OF INVENTION

Figure 1:
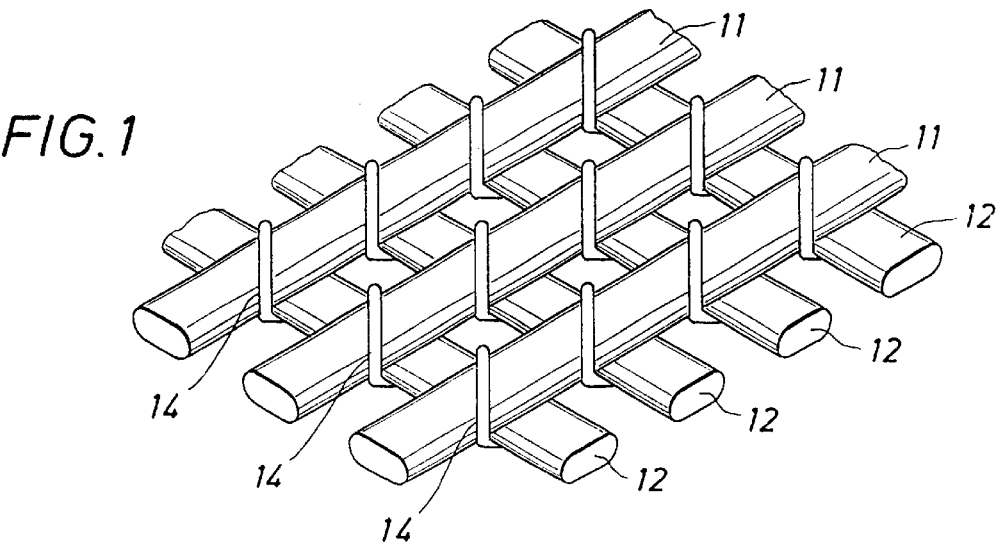
FIG. 1 is an isometric view of a typical fiber arrangement for the tape of this invention.

Referring now to FIG. 1, a preassembled fiber tape strip is shown which is formed of a plurality of fibers 11 which extend parallel to each other in the warp direction which is the main direction of the tape. Those fibers are made of fiber glass, Kevlar, carbon or similar materials. Fibers 12 are disposed perpendicular to the fibers 11 and extend underneath them and typically are joined together with a stitch in the manufacturing and assembly process. Such fibers 12 are in the weft direction across the tape strip. Preferably, the majority strength of the tape strip is provided in the direction of the fibers 11, and in some instances each strip of tape may be formed solely of warp fibers 11. Also, strips of thin metal of steel, aluminum, or other metal, some being perforated, may be used between or outside of the fiber strips in each laminate 15.

The fiber matrix formed of the fibers 11 and 12 may be separately formed and thereafter impregnated with a resin such as an epoxy resin, or the fiber matrix may be made on the same machine that impregnates such fibers with the resin.

Figure 2:
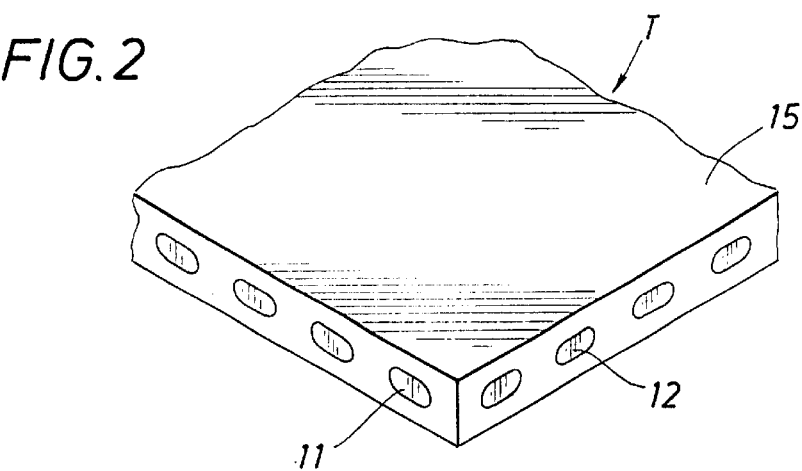
FIG. 2 is a view of the fibers of FIG. 1 embedded in a resin such as an epoxy resin.

FIG. 2 is an illustration of the tape strip T of this invention, one form of which is made by impregnating the fibers 11 and 12 with an epoxy resin or the like to form a single laminate 15. The laminates need to be as thin as possible to reduce strain in them when they are bent onto a pipe surface. Typically, the thickness of each laminate layer is from about 0.010" to about 0.030". This is somewhat of a trade-off between (a) very thin tape which provides for very efficient but long production process, and (b) a thicker tape which is less efficient (more strain) but requires less production time.

Figure 3:
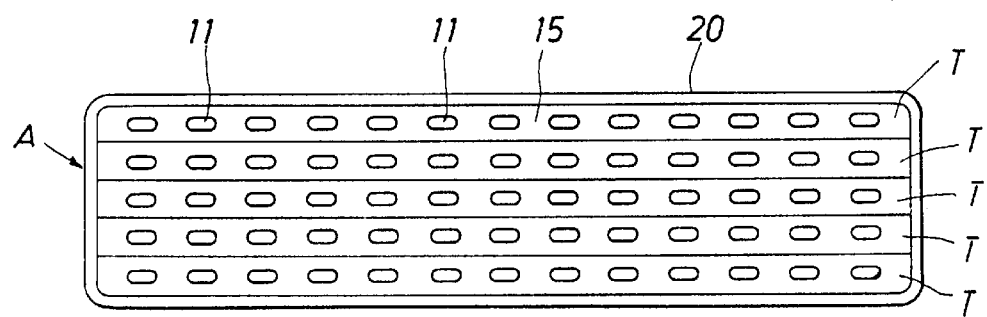
FIG. 3 is a cross sectional view of the final tape which has a plurality of fiber tapes laminated together with a thermoplastic or elastomeric material to form a composite tape as a unit.

Each laminate 15 which is formed by this invention is a separate tape T. A plurality of such tapes T are superimposed on each other as shown in FIG. 3 and, as will be explained, are bonded together by an adhesive which may initially be an uncured epoxy or resin between the tapes T which is later cured during or after the tapes A are wrapped on the core C. Once the adhesive between the tapes cures, the overall laminate product A assumes the radius to which it was bent. This happens because the tapes 15 slide over each other, and then when the adhesive cures, they cannot slide.

In FIG. 3, the finished tape A is shown in cross-section schematically with the warp fibers 11 exposed at the ends, and the epoxy impregnating and bonding the multiple tapes into the final tape T. The weft fibers are not shown in FIG. 3 because they extend across FIG. 3 just behind the cut line for FIG. 3.

An external protective jacket 20 of nylon, polyethylene, or similar flexible thermoplastic or elastomeric material surrounds the superimposed tapes T and encloses the adhesive between such tapes T so that none of the uncured adhesive escapes from the jacket 20 during curing.

Figure 4:
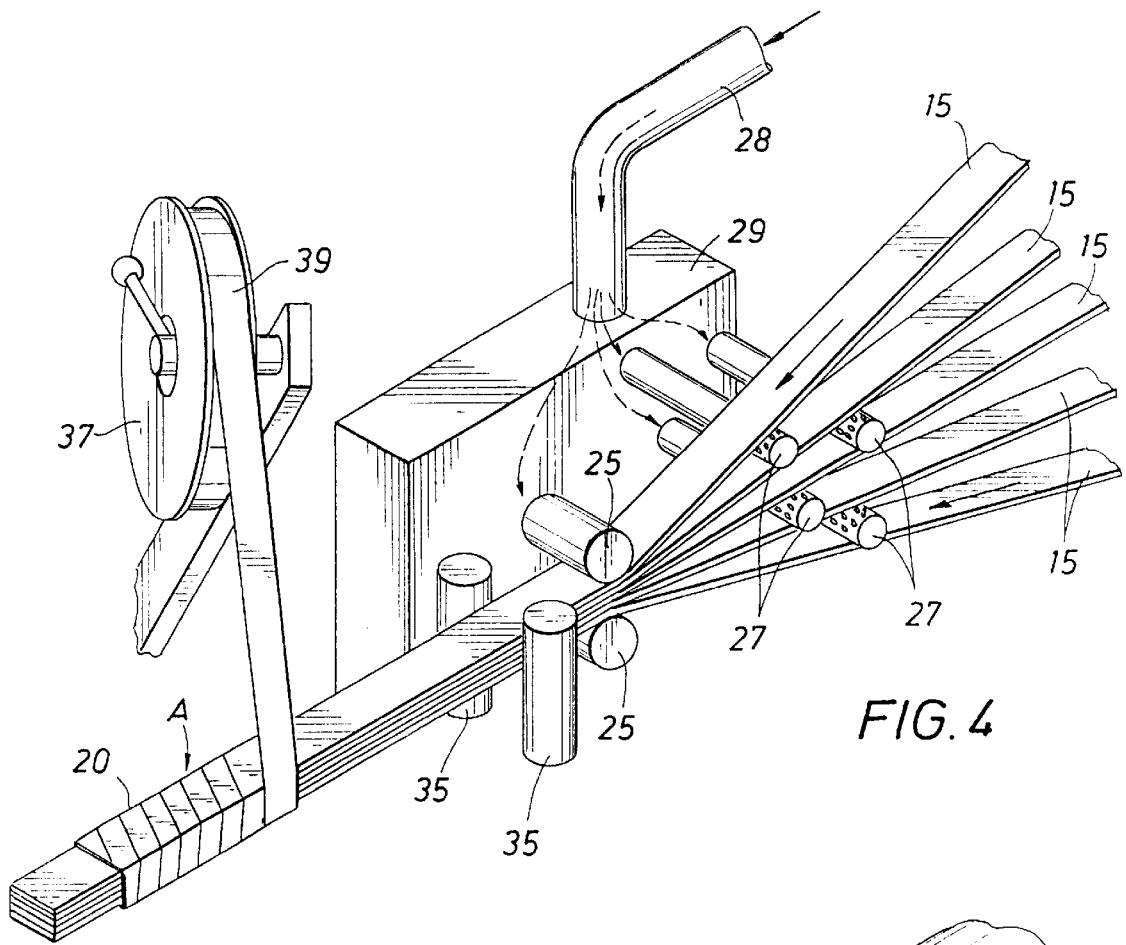
FIG. 4 is a schematic illustration of a method of this invention showing the method and apparatus for making the resin impregnated fiber tapes of this invention.

A typical arrangement for forming the final tape A shown in FIG. 3 is illustrated by the equipment schematically shown in FIG. 4.

By way of example, the laminates 15 or tapes T are arranged in a superimposed relationship and are fed through squeeze rollers 25. Prior to reaching the squeeze rollers 25, the tapes T are spaced apart so that adhesive in the form of a resin or the like is applied between the tapes T with any suitable type of applicator 27 or spray which supplies adhesive or resin from an injector 28 and header 29 suitably connected to the applicator 27.

Guide rollers 35 serve to maintain the tapes T in a superimposed alignment with each other.

Finally, a rotatable spool 37 which has a wrapping strip 39 of polyethylene, nylon or similar flexible thermoplastic or elastomeric material thereon is positioned for feeding a helical wrap of the strip 39 to form a protective jacket 20 by rotating the spool head 37. Such protective jacket 20 is thus formed by the tape 39 being wrapped about the tapes T to form the final multitape product A shown in cross-section in FIG. 3. Instead of the helical wraps 39, a "cigarette" wrap may be formed by a longitudinal strip that extends lengthwise of the tape T, and which is folded to partially or fully extend around or substantially around the tape T. The helical wrap 39 preferably may then be wrapped outside of the cigarette wrap to complete product A.

Figure 5:
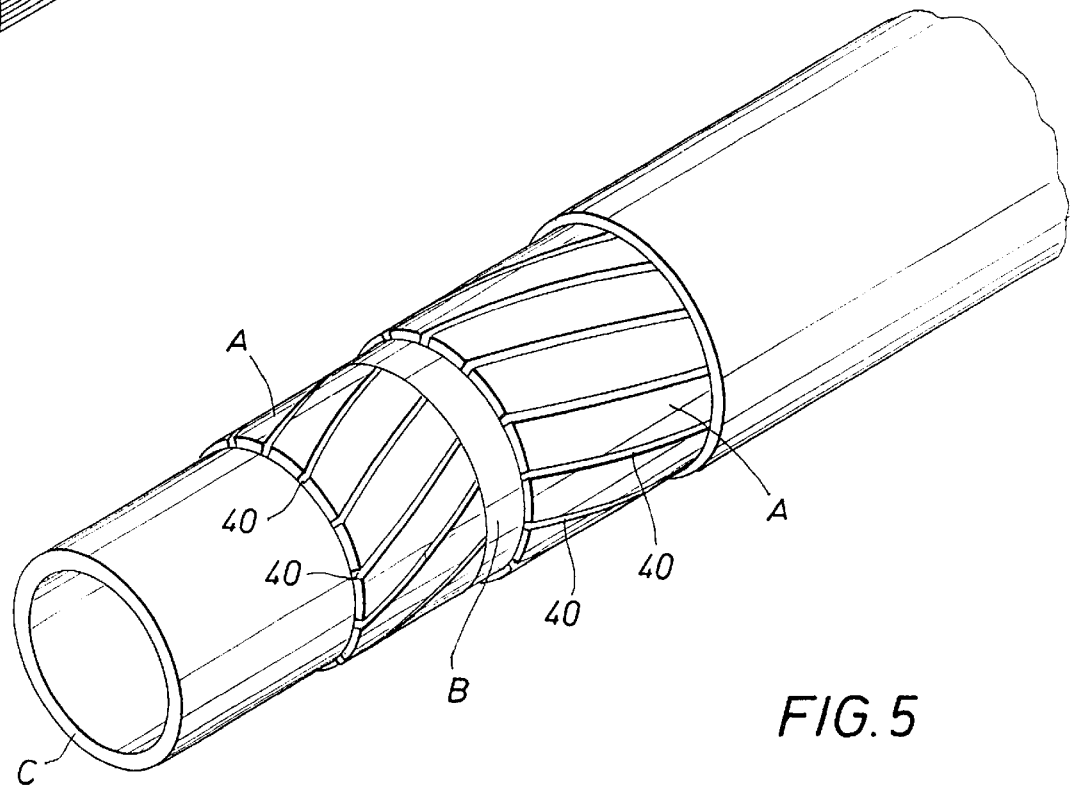
FIG. 5 is an isometric view of a pipe made in accordance with this invention, showing the arrangement of the tapes helically wound on the fluid conducting core or tube.

Referring now to FIG. 5, a simple pipe construction is illustrated for showing the use of the tape A for reinforcing an inner core or tube C which is formed of a flexible fluid conducting material such as flexible polyethylene or metal which is thick enough to have some rigidity but thin enough to still be flexible without significant deformation or collapse. An anti-abrasive layer B of relatively thin polyethylene or the like is preferably disposed between the helical wraps of the tapes A to provide for anti-abrasion between two layers of the helical wraps. Although the wraps of the tapes A are shown as opposite helical wraps, the invention is not limited thereto. For example, the construction may have two or more wraps with a left hand lay, and two or more with a right hand lay, and then two or more with a left hand lay.

It is noted that the tapes A are in a non-bonding relationship to the core or tube C and to each other so that when the core or tube C flexes during use, the tapes A may slide to a limited extent relative to the core or tube C and to each other to permit the flexing of the entire assembly. Additionally, it is noted that there are small gaps or helical spaces 40 between each of the tapes A to provide for limited relative movement of the tapes A with respect to the core or tube C and to each other for flexibility when the core or tube C is flexed.

The foregoing disclosure and description of the invention are illustrative and explanatory thereof, and various changes in the details of the illustrated apparatus and construction and method of operation may be made without departing from the spirit of the invention.

What is claimed is:

1. A method of forming a composite tubular assembly, comprising:

superimposing a first set of a plurality of thin flexible strips of material substantially coextensively with each other;

applying an adhesive between the strips to bond the strips together; and positioning said bonded strips on a fluid conducting tubular core of flexible material in a non-bonding relation to said core to provide sliding relative movement therebetween upon the flexing of said tubular core.

2. The method of claim 1, wherein:

each of said strips in non-metallic.

3. The method of claim 1, wherein:

each of said strips is a fabric of non-metallic fibrous material bonded together with a resin to form a tape.

4. The method of claim 3, wherein:

the fibrous material is composed of primarily uniaxial fibers extending lengthwise in the resin.

5. The method of claim 1, wherein:

the adhesive is a fast curing epoxy or resin.

6. The method of forming a composite tubular assembly, comprising;

forming thin flexible strips of material from fibers and resin bonded together;

superimposing a first set of a plurality of the thin flexible strips of material substantially coextensively with each other;

applying an adhesive between the strips for bonding the strips together; and positioning the bonded strips on a fluid conducting tubular core of flexible material in an initial non-bonding sliding relation relative to said core to provide sliding relative movement therebetween upon flexing of said tubular core as the adhesive is cured.

7. The method of claim 6, wherein:

applying an additional set of strips to the first set of strips positioned on the core.

8. The method of claim 7, wherein:

the first set and the additional set of strips are applied in helical directions.

9. A method of forming a composite tubular assembly, comprising:

forming thin flexible strips of material from fibers and resin bonded together;

then superimposing a first set of a plurality of the thin flexible strips of material substantially coextensively with each other;

applying an adhesive between the strips as they are being superimposed for bonding the strips together; and positioning the strips in contact with each other before the adhesive is completely cured and while the plurality of strips are not yet fully bonded to each other and positioning the plurality of contacted strips on a fluid conducting tubular core of flexible material so that the strips may slide to a limited extent relative to each other as the adhesive is cured.

10. The method of claim 9 including;

heating the strips to cure the adhesive.

11. The method of claim 9, wherein;

applying an additional set of strips to the first set of strips positioned on the core.

12. The method of claim 10, wherein;

the first set and the additional set of strips are applied in helical directions.

\* \* \* \* \*

UNITED STATES PATENT AND TRADEMARK OFFICE
CERTIFICATE OF CORRECTION

PATENT NO. : 6,491,779 B1
DATED : December 10, 2002
INVENTOR(S) : Michael J. Bryant It is certified that error appears in the above-identified patent and that said Letters Patent is hereby corrected as shown below:

<u>Column 1,</u>
Line 38, "form" should be -- from --.

Signed and Sealed this

Nineteenth Day of August, 2003

JAMES E. ROGAN
*Director of the United States Patent and Trademark Office*